July 17, 1956

J. R. YOHO ET AL 2,754,878

APPARATUS FOR BENDING VALVE STEMS

Original Filed Aug. 26, 1949

Inventors
John R. Yoho
Walter J. Strong
By
Att'y

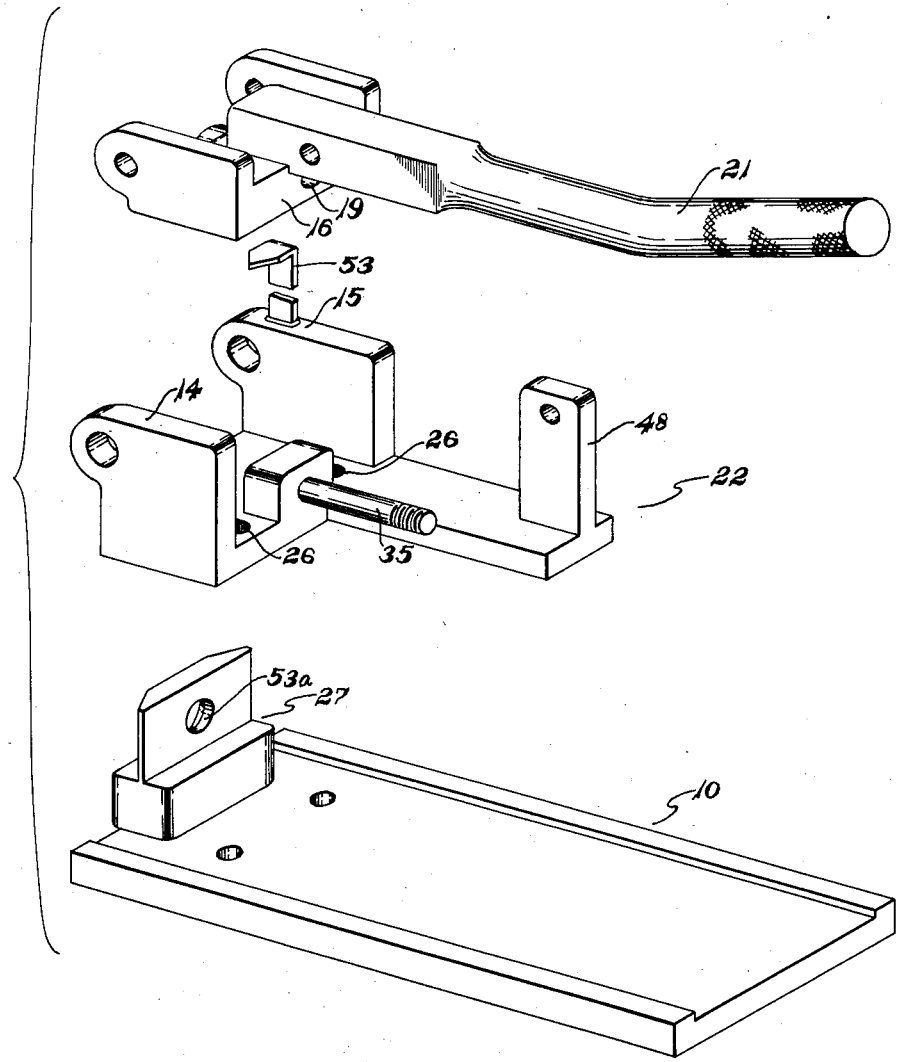

United States Patent Office 2,754,878
Patented July 17, 1956

2,754,878

APPARATUS FOR BENDING VALVE STEMS

John R. Yoho, Akron, and Walter J. Strong, Cuyahoga Falls, Ohio, assignors to The B. F. Goodrich Company, New York, N. Y., a corporation of New York Continuation of abandoned application Serial No. 112,596, August 26, 1949. This application July 27, 1953, Serial No. 370,388

3 Claims. (Cl. 153—39)

This invention relates to apparatus for bending the valve stems of tire inner tubes and is especially useful in bending the stem near the base thereof after the stem has been secured to the inner tube. This is a continuation of our prior application Serial No. 112,596, filed August 26, 1949, now abandoned.

It is necessary on many installations of inner tubes, to employ valves having a bent stem, and the usual procedure is to cure the flange of the valve to the tube while the valve stem is straight, and bend the valve stem after the tube has been cured. In some wheel rim installations, it is necessary to form the bend as close to the valve base flange as possible, that is with the bend starting right at the flange. Since it is not feasible to attempt to bend the stem on an inner radius less than the cross-sectional radius of the stem, devices which bend the stem about a pin (which pin must, for the reason mentioned, have a diameter at least equal to that of the stem) such devices have not permitted close bending due to interference of the pin with the valve base flange.

It is an object of the present invention to bend the valve stem close to the valve base after the stem is assembled with the tube, and if desired to provide for quick adjustment to bends at other positions. Briefly, this is accomplished by supporting the valve stem base and inserting the valve stem in a pivoted block, the pivot axis of which is disposed substantially in the plane of the base end of the stem and is displaced from the axis of the stem in a plane parallel with the axis of the stem a distance substantially equal to the diameter of the stem. This gives a progressively changing bending axis just as occurs when the stem is bent around a pin of the diameter of the valve stem, but the bend can be started at the stem base without mechanical interference by the pin.

These and other objects will appear from the following description and the accompanying drawings.

Of the drawings,

Fig. 4 is an exploded view of the major parts of the apparatus.

Figure 1:
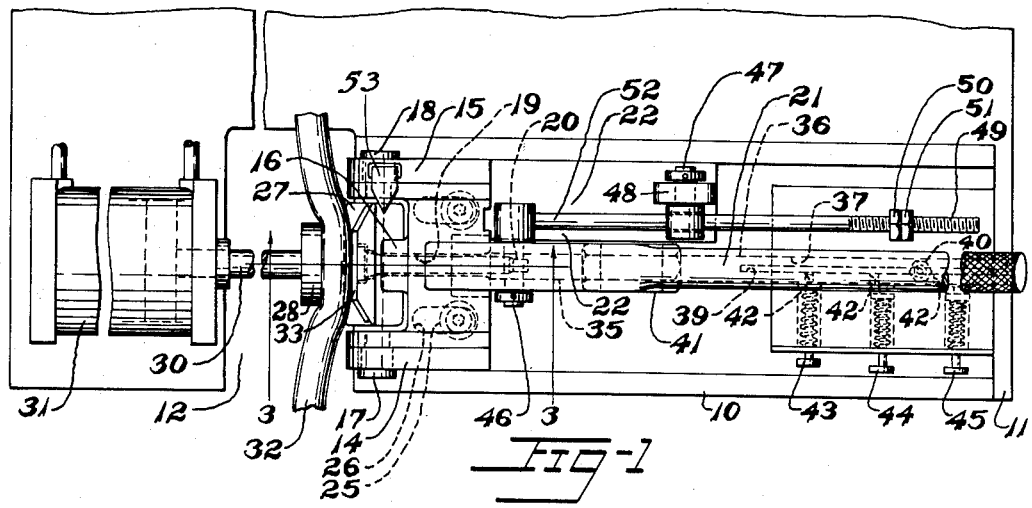
Fig. 1 is a plan view of apparatus constructed in accordance with the invention, showing an inner tube and valve stem in place before bending of the stem.
Figure 2:
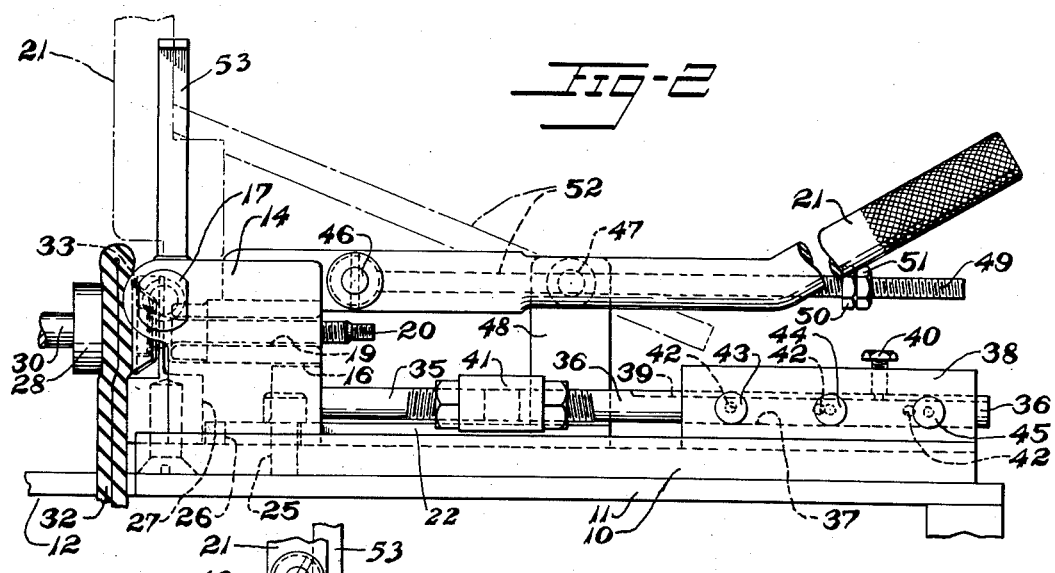
Fig. 2 is a side elevation of the same, the position of the bending block after bending of the stem being indicated in dot-and-dash lines.
Figure 3:
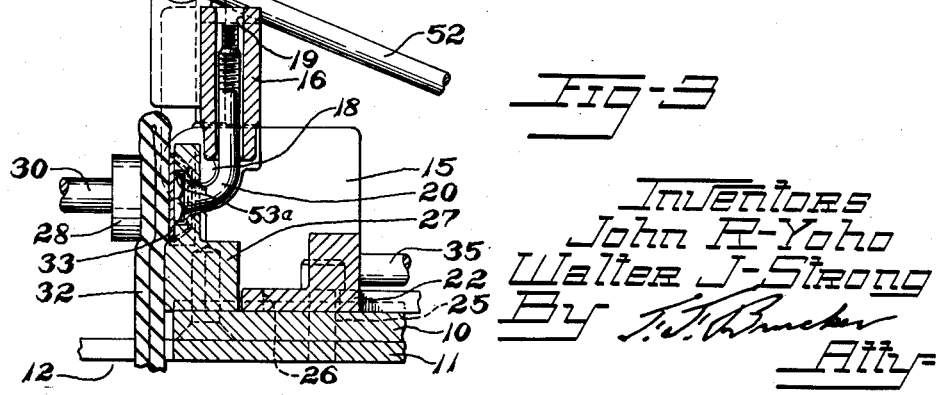
Fig. 3 is a sectional view, taken on line 3—3 of Fig. 1, showing the position of the parts after bending of the stem.

Referring to the drawings, base plate 10 is mounted upon a table 11 at a gap 12 in the table. A supporting member 22 is slidably mounted within a recess in the upper surface of the base plate 10. The supporting member 22 comprises a flat portion adjustably mounted on plate 10 and a pair of spaced apart supports 14, 15. A bending block 16 is pivotally mounted upon a pair of trunnion pins or pivotal mountings 17, 18 on the supports engaging opposite sides thereof. The axis of pivots 17, 18 are transverse to that of the valve stem and are spaced from the stem. The bending block 16 has an elongated bore or channel 19 for slidably receiving the valve stem 20, and has spaced apertured mounting flanges 23, 24 extending forwardly from block 16 past the end face of the body portion of the block. The end face of the block 16 that faces to the left in Figs. 1–3 is, in the preferred embodiment of the invention, disposed in or very close to a plane passing thru the axis of the pivots and perpendicular to the channel 19.

A lever 21 is secured to the bending block 16 to rotate it about the axis of the pivotal mountings 17, 18. The supporting member 22 is mounted on the base by screws 25 riding within slots 26 formed in the base of member 22, for adjusting the member 22 and supports 14, 15 along the base plate 10.

For restraining the valve against movement during a bending operation, abutment means 27 extends up from the base plate 10 between the pivotal supports and has an aperture 53a therethrough for receiving the valve stem 20 while the flange 33 of the valve engages the abutment 27. A clamp member 28 is mounted on the piston rod 30 of a double-acting pressure fluid operated cylinder 31 mounted on table 11 across the gap 12. The arrangement is such that a valve stem 20 on an inner tube 32 may be inserted in bore 19 with its base 33 against stop 27 and clamp member 28 may be advanced to engage the tube 32 and clamp it against stop 27. As can be seen in Figs. 1 and 2 of the drawings, the block supporting member 22 can be adjusted so that the end face of the bending block is substantially in the plane of the opposed face of abutment 27.

For restricting movement of the supporting member 22 relative to the base plate during bending, and for adjusting the pivotal mountings 17, 18 of the supports 14, 15 of member 22, the member 22 is provided with a threaded shank 35 extending along the base plate 10. An oppositely threaded rod 36 is slidably mounted in a bore 37 of a block 38 secured to base plate 10 with its bore 37 aligned with shank 35. Rod 36 has a keyway 39 engaged by the tip of a screw 40 to prevent rotation of rod 36. Rod 36 and shank 35 are connected by a turn-buckle 41. Rod 36 has a series of cavities 42 in its side for selectively interlocking with a set of spring plunger stops 43, 44, 45. The arrangement of the above described stop means is such that quick adjustment of the mounting relative to stop 27 for different positions of bend relative to the base of the valve stem may be made by engaging different stops with rod 36 and fine adjustments may be made by turning the turn-buckle 41.

For gauging the angle of bending, a stop rod 52 is pivoted at one end, as at 46 to lever 21 near bending block 16. It has sliding connection with a swivel 47 on a support 48, a raised portion of member 22. The end of the rod 52 has a long thread 49 on which a stop nut 50 and lock nut 51 are threaded. The arrangement is such that the stop nut limits end motion of rod 52 and consequently rotation of the bending block. A stationary index finger 53 is mounted on support 15 and indicates the position at which lever 21 should stop in making a 90° bend.

In operation, the mountings 17, 18 being set as desired by adjustment of stops 43, 44, 45 and turn-buckle 41, and the angle of bending being set by adjustment of rod 52, with the clamp member 28 retracted and bore 19 parallel to the base plate 10, a valve stem 20 is slipped into bore 19 until the base of the valve stem engages stop 27. The clamp 28 is then advanced against the inner tube 32 which may be hung in the gap 12 of the table. Lever 21 is then operated to rotate the bending block 16 about its pivotal supports to bend the valve stem. After bending, the clamp 28 is retracted and the inner tube and valve stem removed.

The valve bending apparatus of this invention bends a valve with a fixed radius of bend which is determined by the distance between the axis of the trunnions 17, 18 and the axis of the unbent valve stem. The block 16 slides along the valve stem as it bends it, and a free bend is formed identical to what would be formed if the valve were bent around a pin equal in radius to the inner radius of the bend. The axis of trunnions 17, 18 is spaced above the axis of the unbent valve stem by a distance in the order of the diameter of the stem portion to be bent, because experience with the free bending of metal rods and thick tubes has shown that this will produce the smallest radius free bend, that is, a bend in which the inner bend equals the radius of the valve stem.

Since the pivots for the bending block stop short in an axial direction of the portion of the abutment 27 that restrains the valve flange, the block supports can be positioned on the base plate of the apparatus so that the pivot axis is disposed in the plane of the junction of the valve stem and its flange without interference between the pivots and the flange restraining abutment or stop 27. In many cases this is the preferred adjustment because it causes the bend to begin at the aforesaid junction plane, but the same radius of free bend is obtained with the apparatus adjusted so that the pivots (and the end face of block 16) are farther from abutment 27, the only difference being that here the bend begins a farther distance from the junction of the valve stem and flange.

Having described in detail a preferred embodiment of the invention, it will be understood that the invention is defined in the appended claims.

We claim:

1. Apparatus for bending a valve stem, said apparatus comprising a base plate, a stop on said base plate to position the base of the valve stem, a supporting member slidably mounted on said plate, pivotal mountings on said member, a block rotatively mounted on said mountings, an elongate bore in said block for slidably engaging the valve stem, said supporting member being slidably adjustable relative to said plate and stop means for restricting movement of said supporting member with respect to said plate, said stop means being constructed to provide engagement of the bore with the valve stem at a position near said stop for bending the valve stem adjacent the base of the valve stem.

2. An apparatus as defined in claim 1, said apparatus further comprising a rod rigidly attached to said block for rotating said block, a shank projecting from said supporting member parallel to said elongate bore when the block having said bore is in its initial position, said shank comprising a plurality of cavities for selective interlocking with cavity engaging means for selective positioning of said block relative to said stop, and means for limiting the angular travel of said block.

3. Apparatus for bending a valve stem joined to a flange for attachment to an inner tube, said apparatus comprising a base, abutment means on said base for engaging the valve flange and restraining axial motion of the valve in the direction of extension of the stem from the flange, a stem bending block having formed therein an axial channel for slidably receiving the valve stem, said block having an end face facing said abutment means, support means on said base, pivot means pivotally mounting said bending block on said support means, the axis of said pivot means being transverse to that of the valve stem and spaced from the valve stem, said pivot means stopping short, axially, of said valve flange engaging abutment means, said end face of said bending block also being disposed substantially at a plane passing through said pivot axis and perpendicular to the axis of the channel in said block, pivoting of said bending block causing the latter to slide over and bend the valve stem with a free bend, the inner radius of which equals the spacing of the pivot axis from the valve stem.

References Cited in the file of this patent

UNITED STATES PATENTS

| | | |
|---|---|---|
| 139,148 | Harvey | May 20, 1873 |
| 747,466 | McClellan | Dec. 22, 1903 |
| 1,628,581 | Stevens | May 10, 1927 |
| 1,889,239 | Crowley | Nov. 29, 1932 |
| 1,902,881 | Morgan | Mar. 28, 1933 |
| 2,041,365 | Mitchell et al. | May 19, 1936 |
| 2,055,034 | Koehn et al. | Sept. 22, 1936 |